United States Patent Office 3,478,619
Patented Nov. 18, 1969

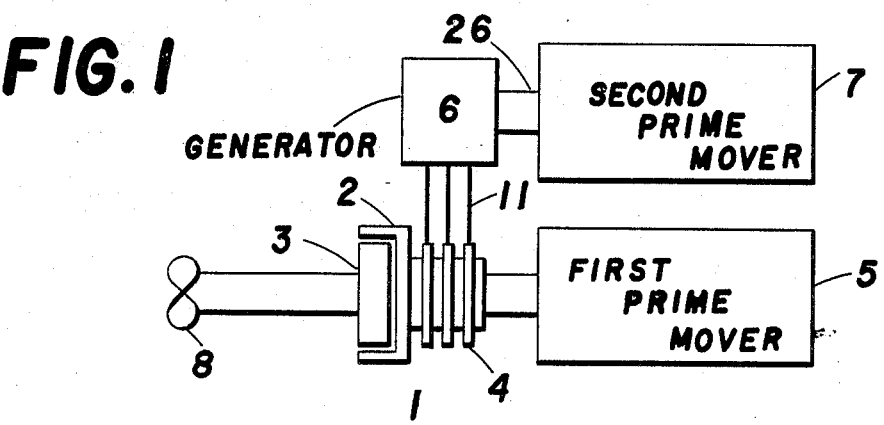
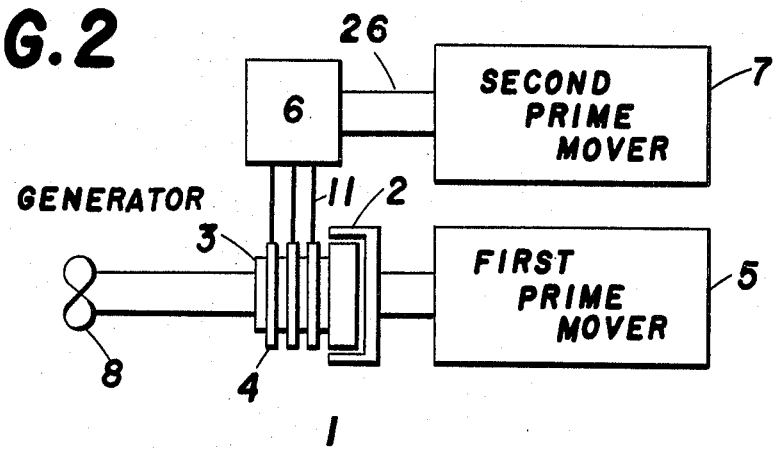
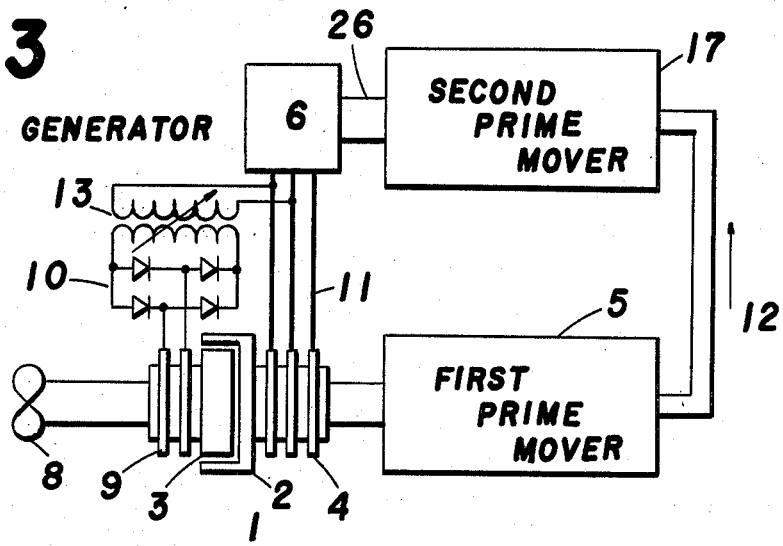

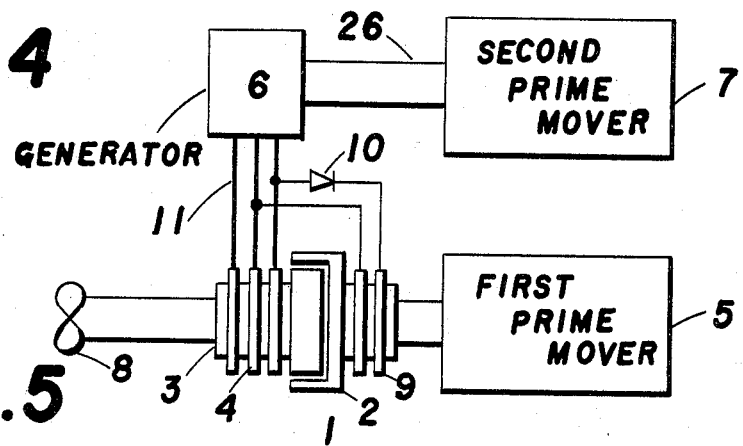
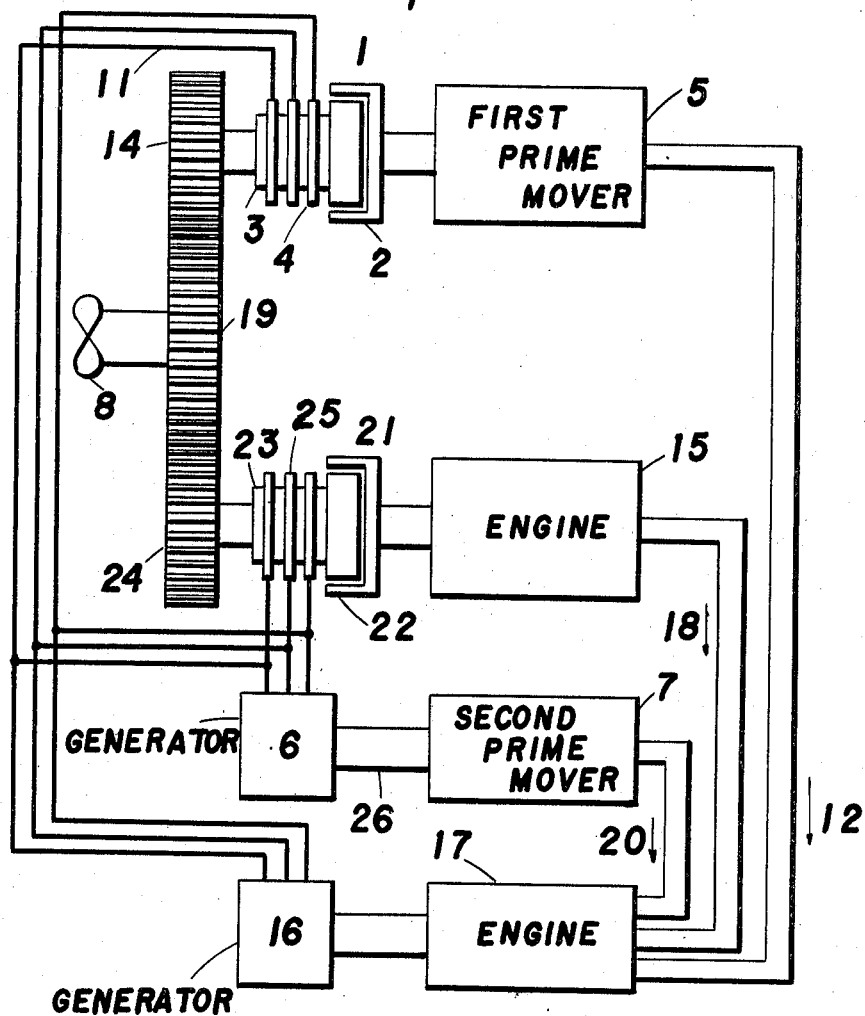

3,478,619
ARRANGEMENTS COMBINING A PLURALITY OF PRIME MOVER POWERS
Fukuo Shibata, 13 Tokiwa-cho, Nishinomiya, Hyogo Prefecture, Japan
Filed June 6, 1967, Ser. No. 645,094
Claims priority, application Japan, Aug. 11, 1966, 41/52,719; Sept. 25, 1966, 41/63,868
Int. Cl. F16h 37/06; H02p 15/00; H02k 7/10
U.S. Cl. 74—661                                    8 Claims

ABSTRACT OF THE DISCLOSURE

In order to drive a load such as a propeller of a ship by combined powers of a plurality of prime movers such as diesel engines without sacrificing efficiency of operation or economy of apparatus of the arrangements, an electromagnetic coupling having two rotors which rotate with respect to each other is installed between a first prime mover and the load, and the electromagnetic coupling is supplied with an electric power from an electric generator driven by a second prime mover through an electric cable, in sequence the load side rotor rotates faster than the other rotor.

BACKGROUND OF THE INVENTION

Field of the invention

This invention is used in fields in which it is necessary to combine powers of a plurality of prime movers such as diesel engines in order to drive a load such as a propeller of a ship, a wheel of a car, a fan, a pump etc. by the plurality of prime movers. Of course, steam turbines, water wheels etc. other than diesel engines can also be used as the said prime movers.

Description of the prior art

In some prior arrangements in which powers of a plurality of prime movers are combined for driving a load, gears are used for combination of powers of the plurality of prime movers. For example, in a prior arrangement for driving a load (a propeller) by combination of powers of four diesels through a gear together with two pinions and flexible couplings such as electromagnetic couplings, an engine plant becomes too long to compact it in a small engine room. In other words, there is a limitation in a total output capacity of engines combined by such a prior arrangement when there is a limit of an output capacity in each engine.

SUMMARY OF THE INVENTION

It is the primary object of the invention to provide an arrangement combining a plurality of prime mover powers in which a length of a plant of the prime movers can be reduced considerably as compared with that of the prior arrangements.

Another object of my invention is to provide an arrangement combining a plurality of prime mover powers whose total output capacity can be very large as compared with that of the prior arrangements, without sacrificing efficiency of operation or economy of apparatus of the arrangement.

An additional object of this invention is to provide an arrangement combining powers of a plurality of prime movers any one of which can be stopped from running whilst keeping the others operating.

A further object of my invention is to provide a control system affording wide speed ranges for an arrangement combining a plurality of prime mover powers which shall be very simple and efficient in operation and which may be readily and economically manufactured and installed.

A still further object of this invention is to make it possible to reduce considerably a space of an engine room of a vessel whilst keeping a total output capacity of combined engines large.

Other objects of this invention will in part be obvious and in part appear hereinafter.

Accordingly, this invention is disclosed in the embodiments thereof shown in the accompanying drawings and comprises the features of construction, combination of elements and arrangement of parts which will be indicated in the appended claims.

BRIEF DESCRIPTION OF THE DRAWING

Referring to the drawing:
FIG. 1 illustrates diagramatically one embodiment of this invention.
FIG. 2 illustrates diagramatically another embodiment of this invention.
FIG. 3 illustrates diagramatically still another embodiment of this invention.
FIG. 4 illustrates diagramatically further one embodiment of this invention.
FIG. 5 illustrates diagramatically still further an embodiment of this invention.

DESCRIPTION OF THE PREFERRED EMBODIMENTS

As shown in FIG. 1, an arrangement of this invention combining powers of a plurality of prime movers 5 and 7 has a combination of a first prime mover 5 from which a mechanical power can be derived; a second prime mover 7 having a rotating shaft 26 from which a mechanical power can be derived; a load 8 driven by the powers of the said first and second prime movers 5, 7; an electromagnetic coupling 1 having two rotors 2, 3 which rotate with respect to each other and are provided between the said first prime mover 5 and the said load 8 and one of which is mechanically coupled with the said first prime mover 5 and the other of which is mechanically coupled with the said load 8; an electric generator 6 which is driven by the said second prime mover 7 and in which mechanical power derived from the said rotating shaft of the said second prime mover 7 can be converted into an electric power; an electric cable 11 which connects electrically between the said electric generator 6 and the said electromagnetic coupling 1; wherein the said electric power converted by the said electric generator 6 from the mechanical power of the said second prime mover 7 is transmitted to the said electromagnetic coupling 1 of which the said rotor 3 mechanically coupled with the said load 8 rotates with respect to, faster than and in the same rotating direction as that of the other rotor mechanically coupled with the said first prime mover, consequently the said load 8 can be driven by the power which flows into the said electromagnetic coupling 1 from the said electric generator 6 through the said electric cable 11 and which is combined with the power transmitted from the mechanical power of the first prime mover 5 through the said electromagnetic coupling 1. An energy converter 6 which is driven by a second prime mover 7 and in which mechanical energy produced by a rotating shaft of the second prime mover 7 can be converted into another kind of energy; an energy transmitting device 11 which is connected between the said energy converter 6 and the said motor; wherein the energy converted by the said converter 6 from the mechanical energy of the said second prime mover 7 is transmitted to the said motor, consequently, the said load 8 can be driven by the energy which flows into the motor from the said converter 6 through the said energy transmitting device 11 and which is combined with the energy transmitted from the mechanical energy of the first prime mover 5 through the said combined set 1 of clutch coupling with motor.

In FIG. 1, an electric alternating current generator 6 is shown as an example of the electric generator driven by the second prime mover 7. A primary rotor 2 of the electromagnetic coupling 1 is driven by the first prime mover 5 and a secondary rotor 3 drives the load 8. An electric winding of the primary rotor 2 is supplied with an alternating current from the alternating current generator 6 through terminals 4. The three phase alternating current makes a rotating field produce in the primary rotor 2. Accordingly, the rotating field produces in the primary rotor 2 even if the primary rotor stops running. If the primary rotor 2 is driven by the first prime mover 5, the rotating speed in relation to the air space of the above rotating field becomes faster than the rotating speed of the rotating field itself when the direction of the rotating field produced in the primary rotor 2 coincides with the direction of the rotation of the primary rotor 2, on the contrary, the rotating speed in relation to the air space of the above rotating field becomes slower than the rotating speed of the rotating field itself when the direction of the rotating field produced in the primary rotor 2 is opposite to the direction of the rotation of the primary rotor 2. The secondary rotor 3 is driven at a rotating speed close to the speed of the rotating field in relation to the air space, by the action of the electromagnetic induction owing to the rotating field, when the secondary rotor 3 is a squirrel cage type rotor. The prime mover 5 may be a steam turbine, a diesel engine etc. Thus, the total energy of the first prime mover 5 and the second prime mover 7 can be delivered to the secondary rotor 3 when the direction of the rotating field made in the primary rotor 2 coincides with the direction of the rotation of the primary rotor 2.

In FIG. 2, three phase alternating current is supplied from the alternating current generator 6 to the secondary rotor 3 of the electromagnetic coupling 1 and not to the primary rotor 2. Thus, the total energy of the first prime mover 5 and the second prime mover 7 can be delivered to the load 8 when the direction of the rotating field made in the secondary rotor 3 is opposite to the direction of the rotation of the secondary rotor 3.

In general, when the alternating current is supplied for excitation of an electromagnetic coupling 1, a source capacity of the alternating current and a capacity of the cable 11 must be large. In order to remove such a disadvantage of FIG. 1 or FIG. 2, one rotor 2 is supplied with an alternating current and terminals 9 of the other rotor 3 is supplied with a direct current from the alterating current generator 6 through a rectifier 10 in FIG. 3. This direct current acts as an exciting current which may be adjusted by a variable ratio transformer, capable of being provided between the A.C. bus 11 and the rectifier 10. Thus, the load 8 is supplied with the energy from the prime mover 5 and the energy from the prime mover 17 in FIG. 3. The symbol 12 is a connection which shows delivery of an exhaust energy between the diesel 5 and the turbine 17 driven by the exhaust gas energy of the diesel 5. The difference between FIG. 4 and FIG. 3 is that the primary rotor 2 is supplied with D.C. and the secondary rotor 3 is supplied with A.C. in FIG. 4, on the contrary, the primary rotor 3 is supplied with A.C. and the secondary rotor 3 is supplied with D.C. in FIG. 3. The relation between the rotating direction of the rotating field and that of the rotor in FIG. 4 is the same as that in FIG. 2. The rotating direction of the rotating field produced in the primary rotor 2 is supplied with A.C. and the second-the same as the direction of the rotation of the primary rotor 2 in FIG. 3, but the relation between the rotating direction of the rotating field which is produced in and rotates with respect to the secondary rotor 3 and the rotating direction of the secondary rotor 3 in FIG. 4 is opposite to the relation between the rotating direction of the rotating field which is produced in and rotates with respect to the primary rotor 2 and the rotating direction of the primary rotor 2 in FIG. 3.

In FIG. 5, the load 8 is supplied with driving energy from the engines 5, 15, 7 and 17 through electromagnetic couplings 1, 21. The primary rotors 2 and 22 of electromagnetic couplings 1 and 21 are driven respectively by engines 5 and 15. The secondary rotors 3 and 23 are arranged to drive gears through pinions 14 and 24. The sliprings 4, 25 of the secondary rotors 3, 23 of the electromagnetic couplings 1, 21 are supplied with alternating current from the generators 6 driven by the diesel 7 and the generator 16 driven by the turbine 17, through the A.C. bus 11. The turbine 17 is driven by the energy of the exhaust gas of the diesels 5, 15 and 7. The symbols 12, 18 and 20 are connections which show delivery of exhaust gas energy between the diesels 5, 15, 7 and the turbine 17.

In FIGS. 1, 2, 3, 4, and 5, either electromagnetic coupling 1, 21, 31, 41 or generator 6 may have pole change winding, so that a propeller 8 speed of a vessel (ship) can have approximately normal speed even if one diesel engine gets out of order. In FIG. 1 or 2, a generator 6 can be a D.C. generator and there can be provided with an electromagnetic coupling 1 having two rotors 2, one of which is coupled with the first prime mover and the other 3 of which is coupled with the load 8 side equipment and one of the said two rotors of the electromagnetic coupling is provided with an electric winding which is supplied with direct current from the said generator 6 and the other of the said two rotors is provided with a commutator and an electric winding which is supplied with a direct current from the said generator 6. In this case also, the rotor mechanically coupled with the load, of the electromagnetic coupling rotates with respect to, faster than and in the same rotating direction as that of the other rotor mechanically coupled with the first prime mover, consequently, the load can be driven by the power which flows into the electromagnetic coupling from the said D.C. generator through the said electric cable and which is combined with the power transmitted from the mechanical power of the first prime mover through the said electromagnetic coupling.

It will be understood easily that the length of the engine plant of FIG. 5 can be shortened considerably than that of any prior arrangement, or the total output capacity of FIG. 5 can be very large than that of any prior arrangement, because two engines 7, 17 of the four engines 5, 15, 7, 17 can be installed mechanically freely from the gear 29.

While these embodiments of my invention hereinbefore illustrated and described perform the objects and provides the advantages previously stated, it may be embodied in various other forms and modifications and it is to be understood, therefore, as not restricted to the specific form hereinbefore set forth but as including variations and modifications thereof coming within the scope of the claims which follow.

What I claim is:

1. An arrangement combining a plurality of prime mover powers which has a combination of:
a first prime mover from which a mechanical power can be derived; a second prime mover having a rotating shaft from which a mechanical power can be derived; a load driven by the powers of the said first and second prime movers; an electromagnetic coupling having two rotors which rotate with respect to each other and are provided between the said first prime mover and the said load and one of which is mechanically coupled with the said first prime mover and the other of which is mechanically coupled with the said load; an electric generator which is driven by the said second prime mover and in which mechanical power derived from the said rotating shaft of the said second prime mover can be converted into an electric power; an electric cable which connects electrically between the said electric generator and the said electromagnetic coupling; wherein the said electric power converted by the said electric generator from the mechanical power of the said second prime mover is transmitted to the said electromagnetic coupling of which the said rotor mechanically coupled with the said load rotates with respect to, faster than and in the same rotating direction as that of the other rotor mechanically coupled with the said first prime mover, consequently, the said load can be driven by the power which flows into the said electromagnetic coupling from the said electric generator through the said electric cable and which is combined with the power transmitted from the mechanical power of the first prime mover through the said electromagnetic coupling.

2. An arrangement combining a plurality of prime mover powers as claimed in claim 1, wherein the first and the second prime movers are diesel engines 3. An arrangement combining a plurality of prime movers as claimed in claim 1, wherein a gear is provided between the electromagnetic coupling and the load.

4. An arrangement combining a plurality of prime mover powers as claimed in claim 1, wherein the electric generator is an alternating current generator; further, one of the two rotors of the electromagnetic coupling is provided with an electric winding.

5. An arrangement combining a plurality of prime mover powers as claimed in claim 1, wherein the electric generator is an alternating current generator; further, one of the two rotors of the electromagnetic coupling is provided with an electric winding which is supplied with an alternating current from the said generator and the other of the said two rotors is provided with an electric winding which is supplied with direct current.

6. An arrangement combining a plurality of prime mover powers as claimed in claim 1, wherein the electric generator is an alternating current generator; further, one of the two rotors of the electromagnetic coupling is provided with an electric winding which is supplied with an alternating current from the said generator the other of the said two rotors is provided with squirrel cage type conductor.

7. An arrangement combining a plurality of prime mover powers as claimed in claim 1, wherein the electric generator is a direct current generator; and one of the said two rotors of the electromagnetic coupling is provided with an electric winding which is supplied with direct current from the said generator and the other of the said two rotors is provided with a commutator and an electric winding which is supplied with a direct current from the said generator.

8. An arrangement combining a plurality of prime mover powers as claimed in claim 1, wherein the electric generator is an alternating current generator; further one of the two rotors of the electromagnetic coupling is provided with an electric winding which is supplied with an alternating current from the said generator; and the said electromagnetic coupling is provided with pole change windings.

References Cited
UNITED STATES PATENTS

| | | | |
|---|---|---|---|
| 2,271,087 | 1/1942 | Maier | 310—96 |
| 2,428,553 | 10/1947 | Carnegie et al. | 310—98 |
| 2,605,313 | 7/1952 | Sadler | 310—96 |
| 2,806,967 | 9/1957 | Eck et al. | 310—96 |
| 2,912,606 | 11/1959 | Fehn | 310—98 |
| 3,032,668 | 5/1962 | Robinson et al. | 192—84 X |
| 3,300,005 | 1/1967 | Good | 192—61 |

ARTHUR T. McKEON, Primary Examiner

U.S. Cl. X.R.

307—47; 310—96; 322—9